United States Patent
Portnoy et al.

(10) Patent No.: US 11,774,895 B2
(45) Date of Patent: Oct. 3, 2023

(54) PRINTING DEVICE PARAMETER CONTROL USING MACHINE LEARNING MODEL, IN ORDER TO MAXIMIZE REPLACEABLE ITEM LIFESPAN

(71) Applicant: Hewlett-Packard Development Company, L.P., Spring, TX (US)

(72) Inventors: Vitaly Portnoy, Ness Ziona (IL); Michel Assenheimer, Ness Ziona (IL); Nailson Boaz Costa Leite, Porto Alegre (BR); Brian Schmitz Tani, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 50 days.

(21) Appl. No.: 17/613,649

(22) PCT Filed: Sep. 6, 2019

(86) PCT No.: PCT/US2019/049940
§ 371 (c)(1),
(2) Date: Nov. 23, 2021

(87) PCT Pub. No.: WO2021/045778
PCT Pub. Date: Mar. 11, 2021

(65) Prior Publication Data
US 2022/0236683 A1 Jul. 28, 2022

(51) Int. Cl.
*G03G 15/08* (2006.01)
*G03G 15/00* (2006.01)
*G06N 20/00* (2019.01)

(52) U.S. Cl.
CPC .......... *G03G 15/556* (2013.01); *G06N 20/00* (2019.01)

(58) Field of Classification Search
CPC .................. G03G 15/1675; G03G 15/556
USPC ..................... 399/9, 12, 13, 24, 27
See application file for complete search history.

(56) References Cited

U.S. PATENT DOCUMENTS

| | | | |
|---|---|---|---|
| 5,225,873 | A | 7/1993 | Lux et al. |
| 5,778,279 | A | 7/1998 | Kawai et al. |
| 6,914,696 | B1 | 7/2005 | Kojima et al. |
| 9,031,470 | B2 | 5/2015 | Kahatabi et al. |
| 9,046,854 | B2 | 6/2015 | Yang et al. |
| 10,067,454 | B2 * | 9/2018 | Nagata ............... G03G 15/1675 |
| 2012/0076515 | A1 | 3/2012 | Rapkin et al. |
| 2012/0143564 | A1 | 6/2012 | Li et al. |
| 2015/0331402 | A1 | 11/2015 | Lin et al. |

FOREIGN PATENT DOCUMENTS

CN 100367125 * 2/2008

* cited by examiner

*Primary Examiner* — Hoan H Tran

(57) ABSTRACT

A printing device includes a printing engine to selectively output print material, a replaceable item of the printing engine, and a subsystem for the printing engine. A machine learning model is used to control controllable parameters of the subsystem for the printing engine, based on physical characteristic measurements of the printing device, to maximize a lifespan of the replaceable item.

15 Claims, 5 Drawing Sheets

PRINTING DEVICE PARAMETER CONTROL USING MACHINE LEARNING MODEL, IN ORDER TO MAXIMIZE REPLACEABLE ITEM LIFESPAN

BACKGROUND

Printing devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

DETAILED DESCRIPTION

As noted in the background, one type of printing device technology is liquid electrophotography (LEP). In a LEP printing device, a charging unit generates a uniform charge on a photoconductive (i.e., electrophotographic) surface like a drum, which can be referred to as a printing image plate (PIP), as the PIP rotates past the charging unit. A scanned laser beam or other electrostatic discharging mechanism, such as an array of light-emitting diodes (LEDs), selectively discharges the PIP in accordance with an image to form a latent image on the PIP, as the PIP rotates past the discharging mechanism A binary ink developer (BID) of the LEP printing device selectively develops an inked image on the PIP in correspondence with the latent image as the BID engages the PIP. The PIP rotates past another drum on which a heated blanket is mounted, transferring the inked image onto the heated blanket, which melts particles within the ink into a smooth tacky film. The heated blanket transfers the image in film form onto a media sheet as the media advances between the heated blanket and an impression drum.

An LEP printing device can include an environmental subsystem. The environmental subsystem of an LEP printing device can capture volatile organic compound vapors dissipated during LEP printing and help ensure that the printing device satisfies regulatory requirements such as safety requirements. The environmental subsystem can also control temperature and humidity within the printing device.

An example environmental subsystem may include various components, including different types of heat exchangers such as an air-to-air heat exchanger and a water-to-air heat exchanger, a blower (i.e., fan), a humidifier, air ducts, and a damper, which regulate the return of cooled air to the LEP printing device. The heat exchangers, blowers, humidifier, and damper can be individually controlled via corresponding parameters. For example, the blower and the damper may be asynchronously turned on or off. In some types of LEP printing devices, the damper may control the return of cooled air close to the PIP, thus affecting the temperature of the of the PIP.

The PIP is an operator-replaceable item of the printing engine of an LEP printing device, with the other components of the printing engine including the charging unit, the discharging mechanism, the BID, and the heated blanket. The PIP may fail during printing, which can cause visible print defects, so in such instances has to be replaced to maintain print quality the PIP has to be replaced to so that image quality is maintained. Reducing PIP failure incidents—i.e., extending PIP lifespan—can further improve printing device productivity.

The temperature of the PIP can have a significant bearing on its lifespan, as well on its prominent role in ensuring print quality. In turn, the environmental subsystem can have a significant effect on PIP temperature, since the damper regulates the return of cooled air close to the PIP. It has been particularly observed that maintaining PIP temperature at a steady state increases its lifespan.

Techniques described herein provide for control of environmental subsystem parameters, such as whether environmental components should be on or off, from measured characteristics of an LEP printing device, using a machine learning model. The measured characteristics include physical characteristics, for instance, which may include various temperature and other environmental measurements taken by sensors within the printing device. The measured characteristics can also include other characteristics, such as printing characteristics like print times, print interruption durations, number and timing of print stops and starts, print job length, and so on. Controlling the environmental subsystem parameters using the machine learning model maximizes PIP lifespan.

After initial training, the machine learning model can be adapted over time to a particular LEP printing device operating in a particular environment and context. Therefore, the machine learning model becomes attuned to maximize PIP lifespan with respect to the temperature and humidity in which the printing device is operating (i.e., its environment), and with respect to the types of print jobs the printing device is printing and otherwise how the device is being used (i.e., its context). More generally, the techniques described herein control the controllable parameters of a subsystem of a printing device based on measured characteristics using a machine learning model, in order to maximize the lifespan of a replaceable item.

Figure 1:
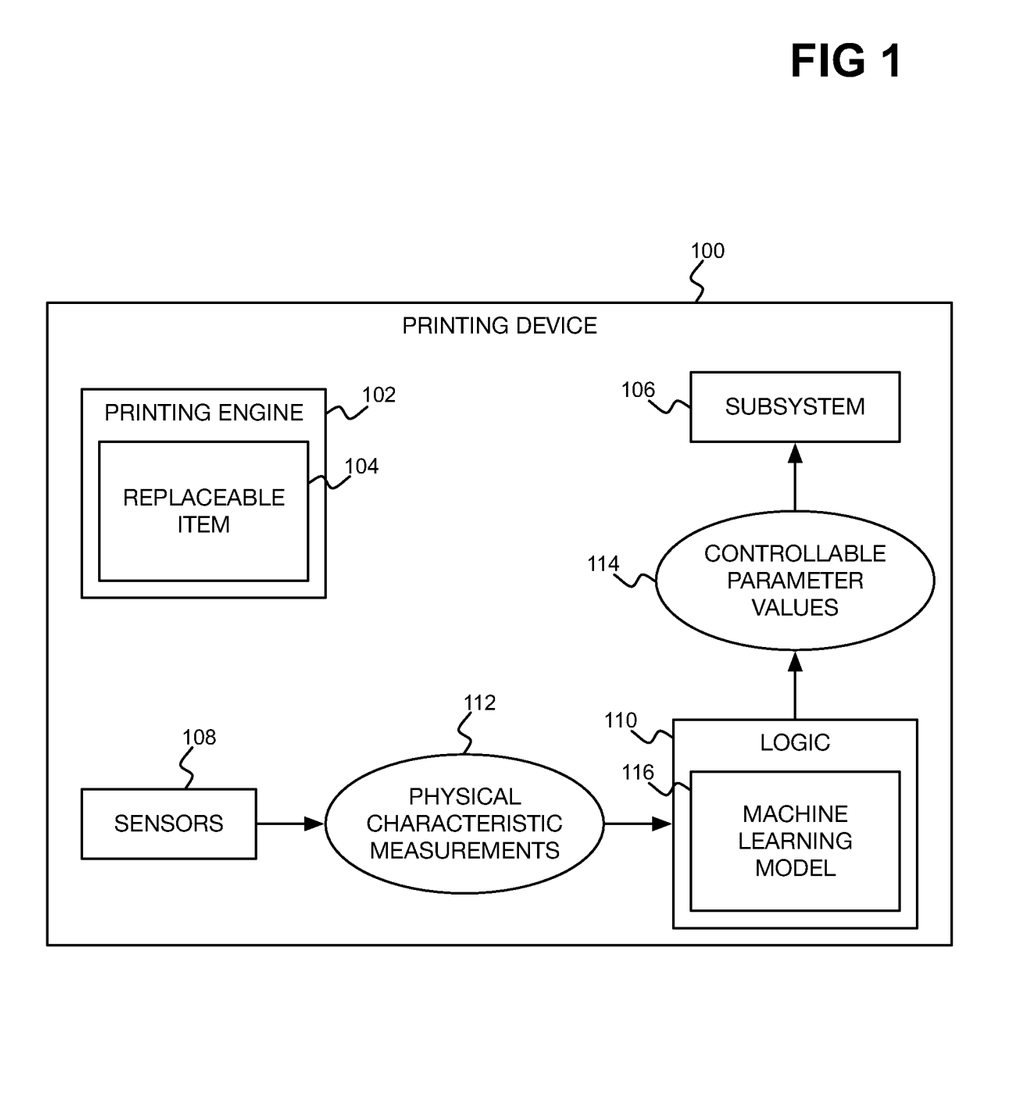
FIG. 1 is a diagram of an example printing device in which a machine learning model is used to control parameters of a subsystem of the printing device in order to maximize replaceable item lifetime.

FIG. 1 shows an example printing device 100. The printing device 100 may be a standalone printer or a multifunction peripheral (MFP), multifunction device (MFD), or all-in-one (AIO) printing device. The printing device 100 may print using any type of printing technology, such as a laser or light-emitting diode (LED) technology like a dry electrophotography (EP) or LEP technology, an inkjet-printing technology, or a three-dimensional (3D) printing technology.

The printing device 100 includes a printing engine 102. The printing engine 102 includes the components of the device 100 by which print material, such as colorant like ink or toner, or another print material such as 3D print material, is selectively output from the device 100. The printing engine 102 may selectively output the print material onto print media like paper to form two-dimensional (2D) images on the print media, or may output the print material to form 3D objects in a layer-by-layer manner.

The printing engine 102 includes a replaceable item 104. The replaceable item 104 may be a replaceable item other than supplies of print material that the printing engine 102 selectively outputs. That is, the replaceable item 104 may be a replaceable item 104 other than the ink, toner, 3D print material or other print material that the printing engine 102 selectively outputs.

For example, for a LEP printing engine 102 that (indirectly) electrographically forms images on media using ink and that includes a charging unit, a discharging mechanism, a BID, and a heated blanket, the replaceable item 104 can be the PIP. As another example, for a dry EP printing engine 102 that electrographically forms images on media using toner, the replaceable item 104 may be a fuser that fuses toner onto the media or a transfer belt module that may include the photoconductive surfaces of the engine 102. As a third example, for an inkjet printing engine 102 that forms images on media by jetting ink, the replaceable item 104 may be the printheads or dies that are separately installable from the supplies of ink.

The printing device 100 includes a subsystem 106 for the printing engine 102. The subsystem 106 may not be part of the printing engine 102. The subsystem 106 as one example may maintain environmental conditions, such as temperature and humidity, within the printing device 100, and/or may maintain the surrounding environment of the device 100, such as by controlling emissions, such as vapor, from the device 100. For instance, the subsystem 106 may be an environmental subsystem, in the case of an LEP or other type of printing engine 102.

The subsystem 106 may include separately controllable components. For example, as noted above, an environmental subsystem 106 can include different types of heat exchangers, blowers, a humidifier, and valves such as dampers, which may be separately controllable. A blower and a damper may be individually turned on and off and therefore controllable. The air flow through the heat exchangers and the humidifier may also be individually turned on and off, or more continuously controlled. For example, the humidifier may be set to a specific humidity level.

The subsystem 106 is controlled by having controllable parameter values 114 set. The subsystem 106 may receive the controllable parameter values 114 as input. Each value 114 may be for a separately controllable parameter of the subsystem 106. For example, one value 114 may control whether an air-to-air heat exchanger of the subsystem 106 is turned on or off, another value 114 may control whether a water-to-air heat exchanger of the subsystem 106 is turned on or off, a third value 114 may control whether a damper of the subsystem 106 is open or closed, and so on.

The printing device 100 includes sensors 108. The sensors 108 can include temperature sensors that measure temperatures at the locations at which they are disposed within the printing device 100. The sensors 108 can include humidity sensors that measure humidity at the locations at which they are disposed within the printing device 100. The sensors 108 can include air flow sensors that measure the rate of air flow at the locations at which they are disposed within the printing device 100. The sensors 108 can include other types of sensors as well. The sensors 108 thus output physical characteristic measurements 112, such as various temperatures, humidity, air flow rate, and so on.

The printing device 100 includes hardware logic 110. The hardware logic 110 can include a processor and a non-transitory computer-readable data storage medium storing program code that the processor executes. For example, the hardware logic 110 may be or include an application-specific integrated circuit (ASIC), which is a type of special-purpose processor programmed in accordance with program code, such that the ASIC constitutes both the processor and the data storage medium. The hardware logic 110 may be or include a general-purpose processor that executes program code stored on a separate data storage medium like a semiconductor integrated circuit (IC) or a magnetic storage medium.

The hardware logic 110 uses a machine learning model 116 in order to maximize the lifespan of the replaceable item 104. In the example of FIG. 1, the machine learning model 116 is stored on and is thus part of the hardware logic 110. In another implementation, the machine learning model 116 may be stored on a computing device separate from the printing device 100. For example, the computing device may be a host computing device to which the printing device 100 is communicatively connected and from which the printing device 100 receives print jobs. As another example, the computing device may be a server computing device to which the printing device 100 is communicatively connected over a network, and from which the device 100 may or may not receive print jobs. The network may be a local network or a remote network, the latter which can include a cloud-computing environment.

Figure 2:
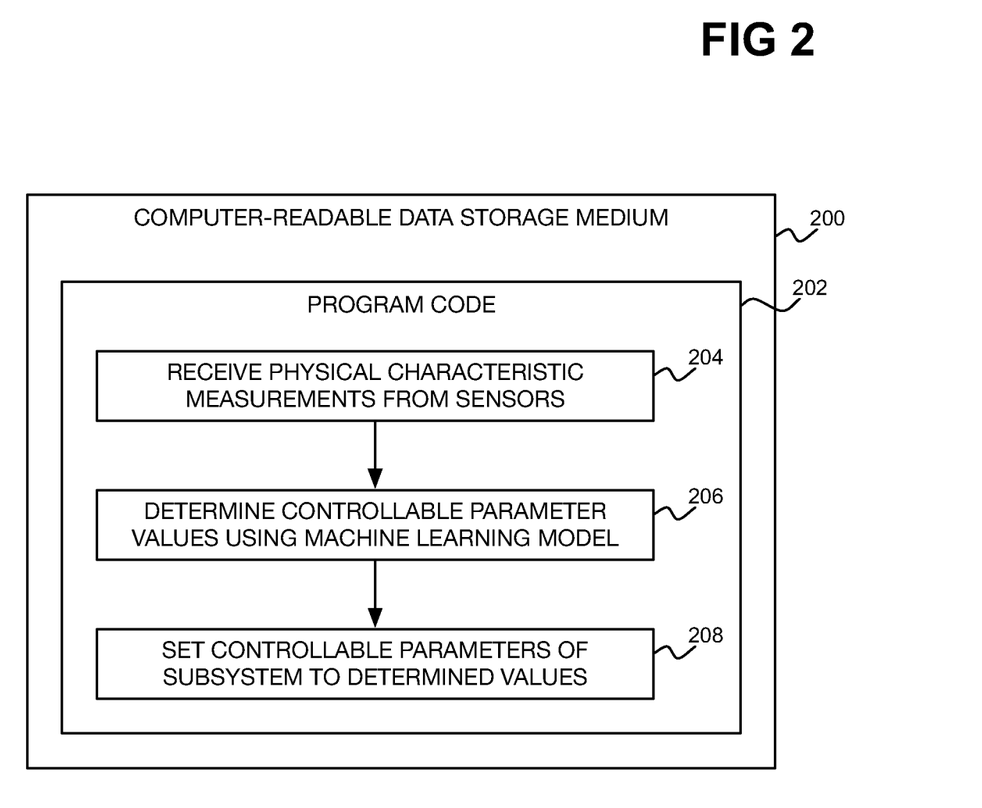
FIG. 2 is a diagram of an example non-transitory computer readable data storage medium storing program code to control parameters of a subsystem of a printing device using a machine learning model based on measured characteristics of the device, to maximize replaceable item lifespan.

FIG. 2 shows an example non-transitory computer-readable data storage medium 200 storing program code 202 that the hardware logic 110 of the printing device 100 executes. The data storage medium 200 may constitute or otherwise be part of the hardware logic 110. The hardware logic 110 executes the program code 202 to perform processing to control the subsystem 106 of the printing device 100 using the machine learning model 116.

The hardware logic 110 receives as input physical characteristic measurements 112 from the sensors 108 (204). The logic 110 can also receive measurements of other characteristics, such as printing characteristics like print times, print interruption durations, number and timing of print stops and starts, print job length, and so on. The hardware logic 110 determines the controllable parameter values 114 by which the subsystem 106 is controlled (206). The hardware logic 110 sets the controllable parameters of the subsystem 106 to the determined values 114 (208). The hardware logic 110 thus provides as output the controllable parameter values 114 for the subsystem 106.

The hardware logic 110 specifically determines the controllable parameter values 114 based on the received physical characteristic measurements 112, and based on any other received characteristic measurements, using the machine learning model 116. The hardware logic 110 provides the physical characteristic measurements 112 and the measurements of any other characteristics as input to the machine learning model 116, and receives the controllable parameter values 114 as output from the machine learning model 116.

The hardware logic 110 thus controls the subsystem 106 by setting parameters of the subsystem 106 to the values 114 determined using the machine learning model 116 to maximize lifespan of the replaceable item 104, based on the characteristic measurements.

Figure 3:
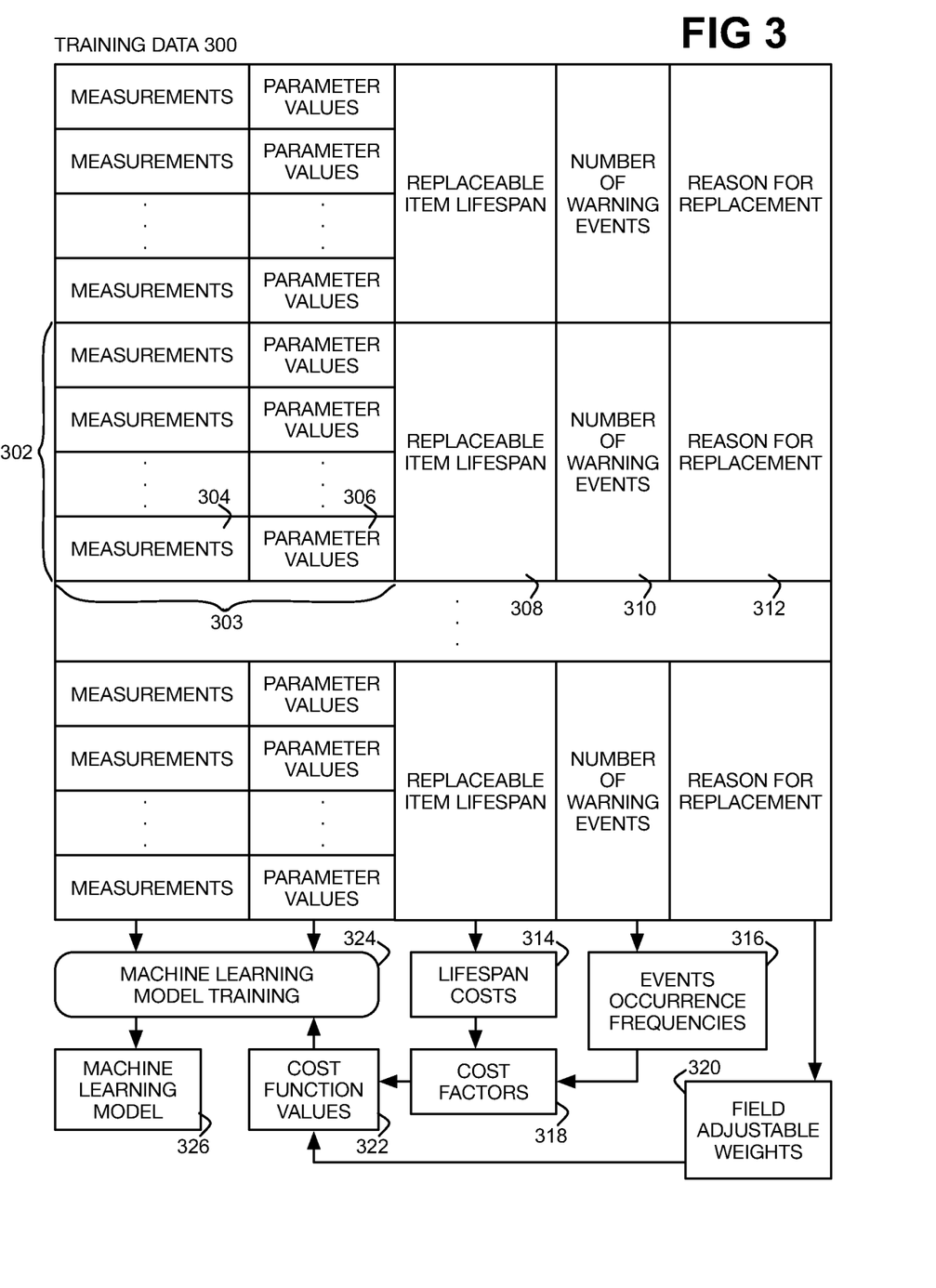
FIG. 3 is a diagram depicting example initial training of a machine learning model that is used to control parameters of a subsystem of a printing device to maximize replaceable item lifetime, based on measured characteristics of the printing device.

FIG. 3 shows example initial training of a machine learning model 326 to control subsystem parameters based on measured characteristics, in order to maximize replaceable item lifespan. Training data 300 can be historical data regarding printing devices of the same kind, such as the same manufacturer and model. The printing devices may be operating in the same or different locations, and thus within the same or different environments. The printing devices may be operating in the same or different contexts, in that the devices may be printing the same or different print job types and/or have the same or different print job loads. The training data 300 may instead be simulated data as opposed to actual historical data that has been collected.

The training data 300 includes multiple data sets 302. Each data set 302, or data case, corresponds to the usage of a replaceable item of a printing device over the lifespan of the item, from first use after insertion into the device through last use after which the item is replaced within the device. Each data set 302 includes a number of pairs 303 of physical measurements 304 and controllable parameter values 306.

There may be tens of thousands, or more, pairs 303 for each data set 302. The number of pairs 303 can correspond to the number of times the values 306 of the subsystem's parameters were set and/or the number of times measurements 304 the printing device's characteristics were taken. For example, each pair 303 can correspond to a different time at which the parameters 106 of the subsystem 106 were set to values 114 as determined based on measurements like the measurements 112 provided by the sensors 108 of FIG. 1. The measurements 304 and the parameter values 306 may be preprocessed using a sliding data window technique or in another manner.

Each data set 302 includes the lifespan 308 of a corresponding replaceable item. The lifespan 308 is the actual lifespan of the replaceable item, from first insertion of the item into a printing device through final removal from the device. The lifespan 308 may be measured in number of page impressions, such as the number of pages that were printed while the replaceable item was used in the printing device.

Each data set 302 includes a number, or count, of warning events 310 that occurred within the printing device over the lifespan 308 of the corresponding replaceable item. Warning events are non-critical events that did not result in failure (and thus replacement) of the item, but nevertheless may have shortened the lifespan 308 of the item or at least affected print quality. An example of a warning event includes the temperature of a printing engine component or the replaceable item exceeding a recommended operating temperature. Another example is user-requested calibration of the printing device not having been performed.

Each data set 302 includes a reason for replacement 312 of its corresponding replaceable item within the printing device. The reason for replacement 312 may also be considered as reason of failure of the replaceable item. In the context of an LEP printing device, example reasons for replacement 312 can include fused ink; electrical failure; cracks; other damage; scratches; and so on. There may be a set list of potential reasons for replacement from which the reason for replacement 312 of each data set 302 is selected.

In the example of FIG. 3, the lifespans 308 of the replaceable items of the data sets 302 are converted to corresponding lifespan costs 314. Each lifespan cost 314 normalizes the lifespan 308 of the replaceable item of a corresponding data set 302. Each lifespan cost 314 may be a value from zero to one, where zero represents that the corresponding replaceable item had a lifespan 308 below a specified minimum lifespan and one represents that its lifespan 308 exceeded a specified maximum lifespan.

In the example of FIG. 3, the numbers of warning events 310 of the data sets 302 are converted to corresponding event occurrence frequencies 316. Each event occurrence frequency 316 is a normalized occurrence frequency of the warning events that occurred during the lifespan 308 of the replaceable item of a corresponding data set 302. Each event occurrence frequency 316 may be a value from zero to one, and may be computed as the number of warning events 310 of a corresponding data set 302 divided by the lifespan 308 of the replaceable item for that data set 302.

In the example of FIG. 3, cost factors 318 for the data sets 302 are computed from the lifespan costs 314 and the event occurrence frequencies 316. For instance, the cost factor 318 of a data set 302 can be the sum of the data set 302's lifespan cost 314 and event occurrence frequency 316. For each data set 302, the cost factor 318 represents the lifespan cost 314 for the replaceable item as penalized by the frequency 316 of warning events that occurred over the item's lifespan 308.

In the example of FIG. 3, the reasons for replacement 312 of the data sets 302 are mapped to field-adjustable weights 320. Each reason for replacement 312 is mapped to a corresponding weight 320. For instance, if there is a set list of potential reasons for replacement from which the reason for replacement 312 of each data set 302 is selected, each reason of the list has a corresponding weight 320.

The weight 320 of a data set 302 indicates the severity of failure or cause of replacement of the replaceable item. A fused ink failure, for instance, may be considered more severe than an electrical failure of the replaceable item. An electrical failure, in turn, may be considered more severe than a crack in the replaceable item.

The weights 320 are field-adjustable in that the weights 320 to which the potential reasons for replacement are mapped may be user-adjustable for a particular printing device or for a particular environment in which printing devices are operating. For example, the user at one location may deem certain reasons for replacement 312 as more severe than other reasons for replacement 312 as compared to the user at another location. Therefore, users can customize the weights 320 to which the reasons for replacement 312 are mapped to fit their particular scenarios.

In the example of FIG. 3, cost function values 322 for the data sets 302 are computed from the cost factors 318 and field-adjustable weights 320. The cost function values 322 are values of a cost function that the machine learning model 326 minimizes. That is, the machine learning model 326 determining subsystem parameter values from printing device characteristic measurements by minimizing the cost function. Setting the parameters of the subsystem to the values determined by the machine learning model 326 maximizes replaceable item lifespan.

The cost function is associated with the lifespan of the replaceable item. In the example of FIG. 3, for each data set 302, the value 322 of the cost function is computed from the data set 302's cost factor 318 and field-adjustable weight 320. For example, the cost function may multiply the cost factor 318 by the field-adjustable weight 320.

Machine learning model training 324 is performed to train the machine learning model 326 from the training data 300. Specifically, training 324 occurs on the basis of the pairs 303 of characteristic measurements 304 and controllable parameter values 306 of the data sets 302, as well as the cost function values 322 for the data sets 302 computed from their lifespans 308, numbers of warning events 310, and reasons for replacement 312. The machine learning model 326 may be a neural network (NN) or other type of machine learning model.

Figure 4:
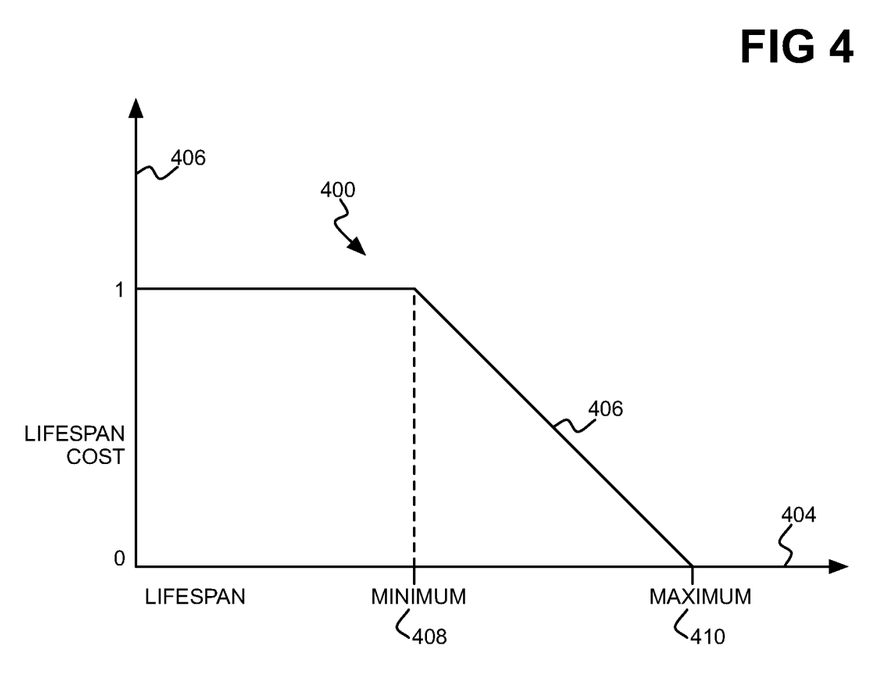
FIG. 4 is a graph of an example function for converting replaceable item lifespan of a data set into a normalized lifespan cost when training a machine learning model to control parameters of a printing device subsystem based on measured characteristics of the printing device.

FIG. 4 shows a graph 400 of an example function 402 for converting the replaceable item lifespan of a data set into a normalized lifespan cost. The function 402 can be used to convert the lifespan 308 of each data set 302 to a lifespan cost 314 in FIG. 3. The x-axis 404 of the graph 400 corresponds to lifespan, such as in number of impressions, and the y-axis 406 corresponds to lifespan cost.

Below a minimum lifespan 408, the lifespan cost is at a maximum value, such as one. This means that when a replaceable item has a lifespan that does not even reach the expected minimum lifespan, the associated lifespan cost is at its greatest. The minimum lifespan 408 may be 15,000 page impressions, as one example.

Above a maximum lifespan 410, the lifespan cost is at a minimum value, such as zero. This means when a replaceable item has a lifespan that exceeds the expected maximum lifespan, the associated lifespan cost is at its smallest. The maximum lifespan 410 may be 80,000 page impressions, as one example.

Between the minimum and maximum lifespans 408 and 410, the lifespan cost decreases linearly from one to zero in the example of FIG. 4. The range between the minimum and maximum lifespans 408 and 410 corresponds to the expected lifespan range of a replaceable item. The lifespan cost may decrease non-linearly, instead of linearly as in FIG. 4.

Figure 5:
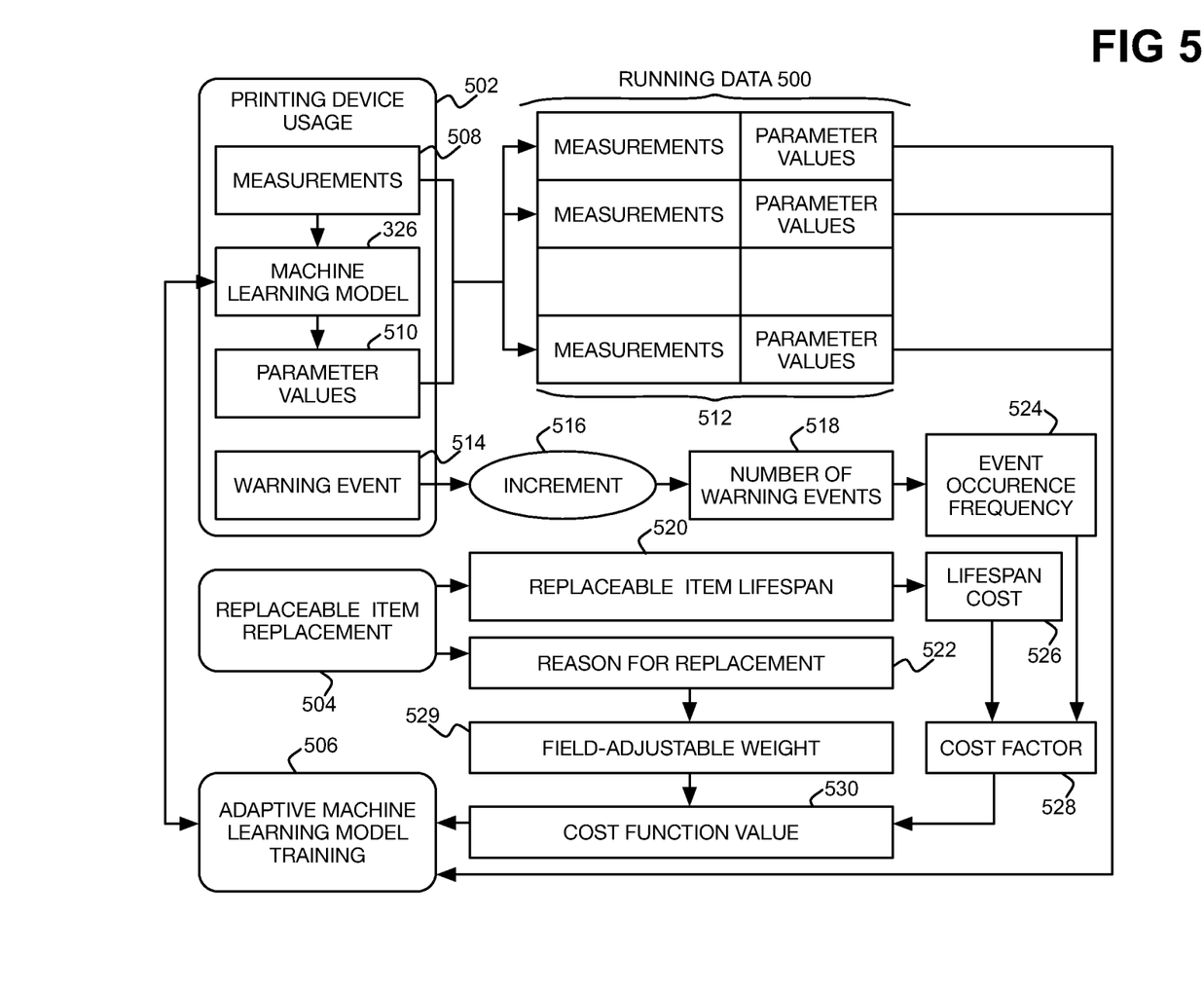
FIG. 5 is a diagram depicting example subsequent adaptive training of a machine learning model that is used to control parameters of a subsystem of a printing device based on measured characteristics of the printing device.

FIG. 5 shows example adaptive training of the machine learning model 326 after the model 326 has been initially trained. During printing device usage 502, a subsystem of the printing device has its parameters controlled via values 510 that the machine learning model 326 determines from measurements 508 of the device's characteristics. Each time the machine learning model 326 determines parameter values 510 from characteristic measurements 508, the measurements 508 and values 510 are collected as a pair 512. Over the lifespan of the replaceable item, running data 500 is collected as a number of such pairs 512.

The running data 500 also includes the number of warning events 518 that occurred during the lifespan of the replaceable item. During printing device usage 502, each time a warning event 514 occurs, the number of warning events 518 is incremented 516. The warning events 514 can occur asynchronously to control of the subsystem using the machine learning model 326. The pairs 512 of measurements 508 and parameter values 510 are thus collected asynchronously to incrementing 516 of the number of events 518.

At some point during printing device usage 502, the replaceable item is replaced 504 within the printing device. At time of replacement 504, the remainder of the running data 500 is specified, including the lifespan 520 of the replaceable item that has been replaced, and the reason for replacement 522 of the item. A user may manually specify the reason for replacement 522 from a set list of potential reasons for replacement after inspection of the item.

An event occurrence frequency 524 is computed from the number of warning events 518 of the running data 500, as is the lifespan cost 526 from the lifespan 520 of the replaceable item that has been replaced, so that a cost factor 528 can be computed, as in FIG. 3. Similarly, the reason for replacement 522 is mapped to a field-adjustable weight 529 as in FIG. 3, and a cost function value 530 computed from the cost factor 528 and the weight 529. Adaptive training 506 of the machine learning model 326 can then occur from the cost function value 530 and the pairs 512 of measurements 508 and parameter values 510.

The running data 500 on which basis adaptive machine learning model training 506 occurs can include as few as one data set: the data set that is generated when a replaceable item is replaced within the printing device. In another implementation, adaptive training 506 may not be performed until the replaceable item has been replaced within the printing device multiple times. The machine learning model 326 may be an adaptive NN or other type of adaptive machine learning model, and may be adaptively trained in a reinforced learning or other manner.

The machine learning model 326 may be adaptively trained on a per-printing device basis, or on a per-location basis for multiple printing devices residing at the same location. For example, the machine learning model 326 may initially be generically trained pursuant to FIG. 3, and an instance of the model 326 subsequently adaptively trained for each printing device pursuant to FIG. 5. Such adaptive training of the machine learning model 326 for each printing device renders it more specific to the environment and context in which each device is being used.

Figure 6:
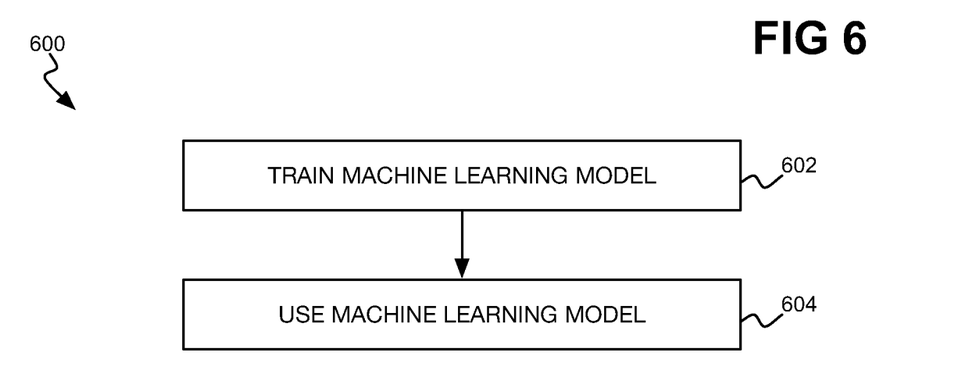
FIG. 6 is a flowchart of an example method.

FIG. 6 shows an example method 600. The method 600 includes training a machine learning model that provides values for controllable parameters of a subsystem for a printing engine of a printing device from characteristic measurements of the printing device (602). Setting the parameters to the values provided by the machine learning model maximizes a lifespan of a replaceable item. The machine learning model may be initially trained as a generic machine learning model not specific to the environment and context in which the printing device is used. The method 600 includes using the machine learning model to set the controllable parameters of the subsystem (604). As the replaceable item is replaced within the printing device, the method 600 may adaptively train the machine learning model to render it more specific to the environment and context in which the device is used.

Techniques have been described herein for controlling parameters of a subsystem for a printing engine of a printing device, such as the environmental subsystem of an LEP printing device. The parameters are controlled based on measured characteristics of the printing device, using a machine learning model, to maximize lifespan of a replaceable item of the device, such as the PIP of an LEP printing device. The machine learning model can minimize a cost function associated with the replaceable item lifespan.

We claim:

1. A printing device comprising:
   a printing engine to selectively output print material;
   a replaceable item of the printing engine and having a lifespan;
   a subsystem for the printing engine and having controllable parameters;
   a plurality of sensors to measure physical characteristics of the printing device; and
   logic to control the controllable parameters of the subsystem based on the measured physical characteristics using a machine learning model, to maximize the lifespan of the replaceable item.

2. The printing device of claim 1, wherein the machine learning model minimizes a cost function associated with the lifespan of the replaceable item.

3. The printing device of claim 2, wherein the cost function is based on a cost factor associated with the lifespan of the replaceable item multiplied by a field-adjustable weight corresponding to a replacement reason for the replaceable item.

4. The printing device of claim 2, wherein the cost function is based on a cost factor associated with the lifespan of the replaceable item, the cost factor based on a cost corresponding to the lifespan of the replaceable item and a frequency of non-critical printing device warning events occurring over the lifespan of the replaceable item.

5. The printing device of claim 2, wherein the cost function that the machine learning model minimizes is based on a cost factor associated with the lifespan of the replaceable item multiplied by a field-adjustable weight corresponding to a replacement reason for the replaceable item,
wherein the cost factor is based on a cost corresponding to the lifespan of the replaceable item and a frequency of non-critical printing device warning events occurring over the lifespan of the replaceable item.

6. The printing device of claim 1, wherein the printing engine is a liquid electrophotography (LEP) printing engine, the replaceable item is a photoconductive printing image plate (PIP) of the printing engine, and the subsystem for the printing engine is an environmental subsystem for the printing engine.

7. A non-transitory computer-readable data storage medium storing program code executable by a printing device to:
receive physical characteristic measurements of the printing device from a plurality of sensors of the printing device;
determine, from the physical characteristic measurements, values of controllable parameters of a subsystem for a printing engine of the printing device, using a machine learning model, to maximize a lifespan of a replaceable item of the printing engine; and
set the controllable parameters of the subsystem to the determined values to control the subsystem for the printing engine, the printing engine to selectively output print material.

8. The non-transitory computer-readable data storage medium of claim 7, wherein the machine learning model is initially trained as a generic machine learning model and is subsequently adaptively trained as the replaceable item of the printing engine is replaced within the printing device to render the machine learning model more specific to the environment and a context in which the printing device is used.

9. The non-transitory computer-readable data storage medium of claim 7, wherein the machine learning model minimizes a cost function,
and wherein the cost function is based on a cost factor associated with the lifespan of the replaceable item multiplied by a field-adjustable weight corresponding to a replacement reason for the replaceable item.

10. The non-transitory computer-readable data storage medium of claim 7, wherein the machine learning model minimizes a cost function,
and wherein the cost factor is based on a cost corresponding to the lifespan of the replaceable item and a frequency of non-critical printing device warning events occurring over the lifespan of the replaceable item.

11. The non-transitory computer-readable data storage medium of claim 7, wherein the printing engine is a liquid electrophotography (LEP) printing engine, the replaceable item is a photoconductive printing image plate (PIP) of the printing engine, and the subsystem for the printing engine is an environmental subsystem for the printing engine.

12. A method comprising:
training a machine learning model that provides values for controllable parameters of a subsystem for a printing engine of a printing device from physical characteristic measurements of the printing device, the machine learning model; and
using the machine learning model to set the controllable parameters of the subsystem for the printing engine to maximize lifespan of a replaceable item of the printing engine, the printing engine to selectively output print material.

13. The method of claim 12, wherein the machine learning model is initially trained as a generic machine learning model not specific to an environment and a context in which the printing device is used,
and wherein the method further comprises, as the replaceable item of the printing engine is replaced within the printing device, adaptively training the machine learning model to render the machine learning model more specific to the environment and the context in which the printing device is used.

14. The method of claim 12, wherein the machine learning model minimizes a cost factor,
wherein the cost function is based on a cost factor associated with the lifespan of the replaceable item multiplied by a field-adjustable weight corresponding to a replacement reason for the replaceable item,
wherein the cost factor is further based on a cost corresponding to the lifespan of the replaceable item and a frequency of non-critical printing device warning events occurring over the lifespan of the replaceable item.

15. The method of claim 12, wherein the printing engine is a liquid electrophotography (LEP) printing engine, the replaceable item is a photoconductive printing image plate (PIP) of the printing engine, and the subsystem for the printing engine is an environmental subsystem for the printing engine.

* * * * *